United States Patent [19]
Cherian

[11] 4,014,607
[45] Mar. 29, 1977

[54] REMOVABLE SCREENING SYSTEM FOR A TRANSPARENCY REPRODUCTION MACHINE

[75] Inventor: Abraham Cherian, Webster, N.Y.
[73] Assignee: Xerox Corporation, Stamford, Conn.
[22] Filed: Mar. 3, 1976
[21] Appl. No.: 663,388
[52] U.S. Cl. .................................. 355/3 R; 355/75
[51] Int. Cl.² ...................................... G03G 15/00
[58] Field of Search ............. 355/3 R, 75, 4; 96/45

[56] References Cited
UNITED STATES PATENTS

| | | | |
|---|---|---|---|
| 3,120,790 | 2/1964 | Carlson et al. | 355/3 R |
| 3,580,671 | 5/1971 | Lavander | 355/3 R |
| 3,914,040 | 10/1975 | McVeigh | 355/3 R |

Primary Examiner—Richard L. Moses
Attorney, Agent, or Firm—J. J. Ralabate; H. Fleischer; C. A. Green

[57] ABSTRACT

An electrophotographic printing machine in which a transparency or opaque original document is reproduced. A movable screen is located in a first position spaced from the path of the transparency light image in order to reproduce the original document. When the transparency is being reproduced, the screen is moved to a second position in the path of the transparency light image for modulating the light image thereof.

11 Claims, 2 Drawing Figures

REMOVABLE SCREENING SYSTEM FOR A TRANSPARENCY REPRODUCTION MACHINE

BACKGROUND OF THE INVENTION

This invention relates generally to an electrophotographic printing machine, and more particularly concerns an electrophotographic printing machine adapted to reproduce either an opaque original document or a transparency.

In the process of electrophotographic printing, a charged photoconductive member is exposed to a light image of an original document. The irradiated areas of the photoconductive surface are discharged selectively recording thereon an electrostatic latent image of the original document. A development system moves a developer mix of carrier granules and toner particles into contact with the latent image recorded on the photoconductive surface. The toner particles are attracted electrostatically from the carrier granules to the latent image forming a toner powder image thereon. Thereafter, the toner powder image is transferred from the latent image to a sheet of support material. After the toner powder image has been transferred to the sheet of support material, the sheet of support material passes through a fixing device which causes the toner powder image to permanently adhere thereto. The foregoing briefly describes the general concept of electrophotographic printing.

Multi-color electrophotographic printing is substantially the same as has heretofore been described. However, a plurality of single color light images are employed to record single color electrostatic latent images on the photoconductive surface. Each single color electrostatic latent image is developed with the appropriately colored toner particles. Successive single color toner powder images are transferred to the sheet of support material forming a multi-layered toner powder image. The multi-layered toner powder image is permanently affixed to the sheet of support material resulting in a multi-color copy of the original document being reproduced.

A wide variety of machines have been developed for reproducing specific types of original documents. For example, machines are presently in wide commercial use for reproducing microfilm. Exemplary patents describing microfilm reproduction machines are U.S. Pat. No. 3,424,525 issued to Towers et al. in 1969; U.S. Pat. No. 3,542,468 issued to Blow, Jr. in 1970; and U.S. Pat. No. 3,547,533 issued to Stokes et al. in 1970. In machines of this type, an enlarged copy of a microfilm input is reproduced. However, it is extremely difficult to produce good pictorial quality copies. Moreover, until recently, color transparencies were not readily reproducable. However, with the advent of multi-color electrophotographic printing, the capability to copy a color slide was developed. A suitable electrophotographic printing machines designed to copy slides is described in co-pending application, Ser. No. 540,617 filed in 1975. As described therein, the light image of the color transparency passes through a screen positioned on the machine platen. The modulated light image is filtered as it passes through the machine optics to selectively discharge the charged portion of the photoconductive surface. Successive single color electrostatic latent images are formed and developed. These powder images are transferred to the sheet of support material, in superimposed registration with one another, resulting in a copy corresponding to the light image of the color transparency being projected through the machine optics. A field lens and screen are positioned on the platen. The field lens converges the diverging light rays of the light image while the screen modulates the light image. However, it has been found that the screen and field lens are frequently unwieldy to handle when converting from an opaque copying machine to a transparency copying machine. Moreover, the possibility exists that the screen and field lens may be positioned erroneously on the platen or mislayed and lost when removed therefrom.

Accordingly, it is the primary object of the present invention to improve the structure holding the screen and field lens adjacent to the printing machine platen so as to facilitate the removal thereof therefrom when switching modes of operation.

SUMMARY OF THE INVENTION

Briefly stated, and in accordance with the present invention, there is provided an electrophotographic printing machine for reproducing a transparency or opaque original document.

Pursuant to the features of the present invention, the printing machine includes a transparent platen and a photoconductive member. Means are provided for charging the photoconductive member to a substantially uniform level. Forming means produce a light image of the transparency. Means, mounted movably on the transparent platen, modulate the light image. The modulating means is movable from a first position remote from the path of the transparency light image to a second position in the path of the transparency light image. When the modulating means is in the first position, an opaque original document is being reproduced. A transparency is reproduced when the modulating means is in the second position. In this manner, the charged portion of the photoconductive member is selectively discharged to record thereon a modulated electrostatic latent image of the transparency.

BRIEF DESCRIPTION OF THE DRAWINGS

Other objects and advantages of the present invention will become apparent upon reading the following detailed description and upon reference to the drawings, in which.

While the present invention will hereinafter be described in connection with the preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
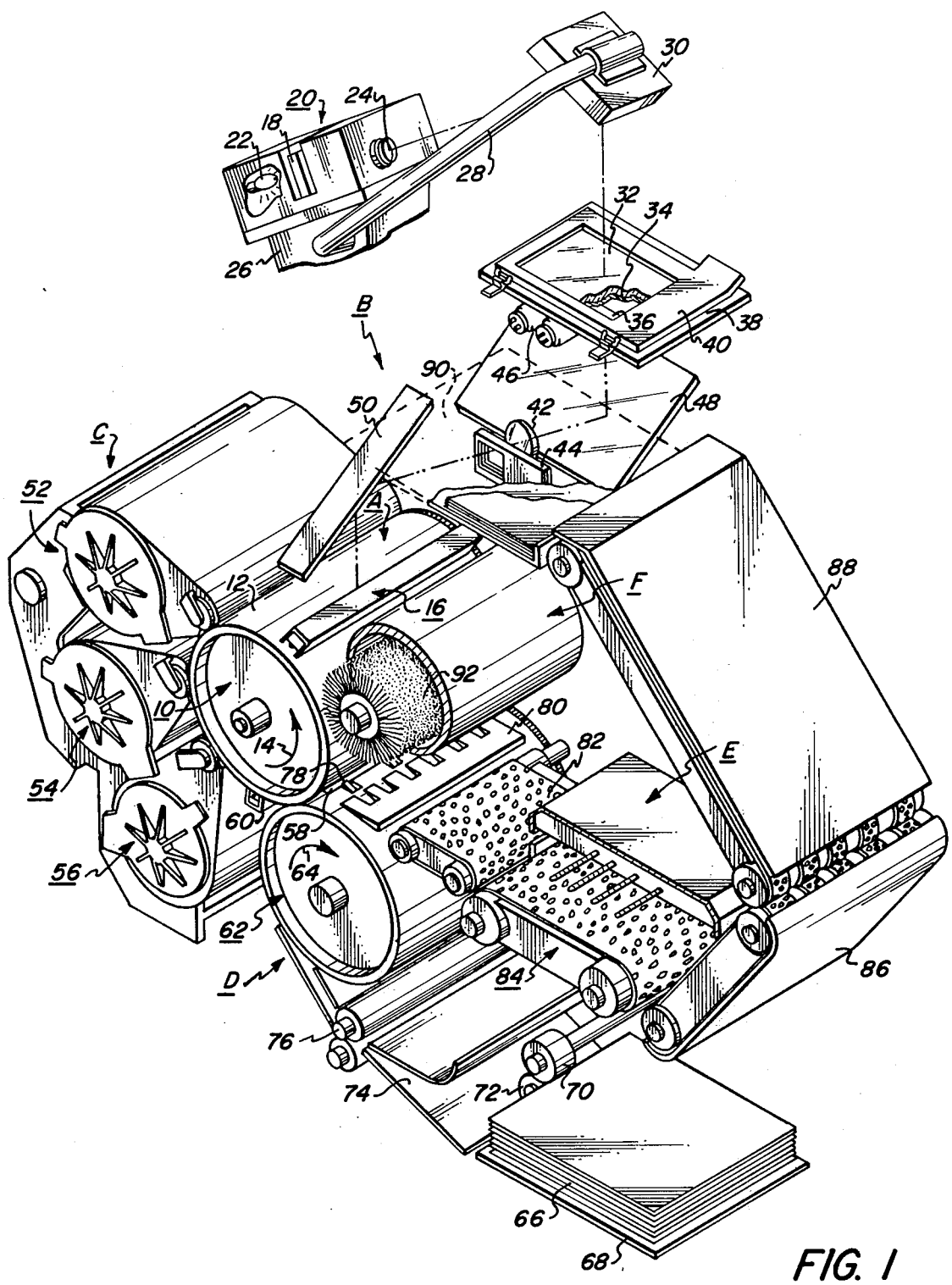
FIG. 1 is a schematic perspective view illustrating an electrophotographic printing machine incorporating the features of the present invention therein.

For a general understanding of an electrophotographic printing machine incorporating the features of the present invention therein, reference is had to FIG. 1. In the drawings, like reference numerals have been used throughout to designate identical elements. FIG. 1 depicts a multi-color electrophotographic printing machine arranged to produce color copies from a color transparency or opaque original document. Although the color electrophotographic printing machine of the present invention is particularly well adapted for producing color copies, it should become evident from the following discussion that it is equally well suited for producing black and white copies from black and white transparencies and is not necessarily limited to the particular embodiment described herein.

As shown in FIG. 1, the electrophotographic printing machine includes a photoconductive member having a rotatably drum 10 with a photoconductive surface 12 entrained thereabout and secured thereto. Photoconductive surface 12 is made preferably from a polychromatic selenium alloy of a type described in U.S. Pat. No. 3,655,377 issued to Sechak in 1972. A signal generator (not shown) rotates in conjunction with drum 10 to activate sequentially the various processing stations within the printing machine.

For purposes of the present application, each processing station operating in the electrophotographic printing machine will be described briefly hereinafter.

As drum 10 rotates in the direction of arrow 14, it passes through charging station A. Charging station A has a corona generating device, indicated generally by the reference numeral 16, disposed thereat. Corona generating device 16 charges a portion of photoconductive surface 12 to a relatively high substantially uniform level. A suitable corona generating device is described in U.S. Pat. No. 3,875,407 issued to Hayne in 1975. After photoconductive surface 12 is charged to a substantially uniform level, drum 10 rotates the charged portion thereof to exposure station B.

At exposure station B, the charged area of photoconductive surface 12 is exposed to a color filtered light image of color transparency 18, as exemplified by a 35 MM slide. Color transparency 18 is positioned in slide projector 20 which includes a light source 22 adapted to provide illumination therefor. Slide projector 20 comprises a lens 24 having an adjustable focus to produce an enlarged or magnified image of color transparency 18. As shown in FIG. 1, slide projector 20 is mounted on frame 26 secured to the printing machine. Arm 28 extends outwardly therefrom and has one end thereof mounted pivotably thereon. Mirror 30 is mounted rotatably on the other end of arm 28. In this manner, the light image projected from slide projector 20 is directed in a downwardly direction by mirror 30 through Fresnel lens 32, screen 34, and composition frame 36 all disposed on transparent platen 38. Fresnel lens 32 and screen 34 are mounted contiguous with one another in frame 40, i.e., Fresnel lens 32 and screen 34 are sandwiched together in frame 40. Frame 40 is mounted rotatably and removably on transparent platen 38. The detailed structure of this arrangement will be described hereinafter with reference to FIG. 2.

In the transparency copying mode, frame 40 is pivoted in a downwardly direction so as to be disposed on platen 38. In this way, the light image of transparency 18 is directed through Fresnel lens 32 and screen 34 by mirror 30. Contrawise, when a colored opaque original document is being reproduced, frame 40 is pivoted away from platen 38 and may be removed therefrom. This enables an opaque original document to be disposed upon platen 38 and reproduced by the printing machine. Composition frame 36 is interposed between screen 34 and platen 38. Preferably, composition frame 34 is an opaque sheet having an aperture therein, i.e., a picture frame or informational frame, which may have indicia inscribed thereon. The border of composition frame 36 extends in an outwardly direction from the enlarged light image of the color transparency. Screen 34 modulates the color transparency light image forming a half tone light image which is combined with the light image of the composition frame. In this manner, a combined image of the enlarged color transparency light image and composition frame light image is formed. The light image of the color transparency is formed via the scanning system. The scanning system includes a moving lens system designated generally by the reference numeral 42, and a color filter mechanism, shown generally at 44. Lamps 46 move in a timed relationship with lens 42 and filter mechanism 44 to scan and illuminate successive incremental areas of composition frame 36.

Size-for-size copies of the transparency rather than enlarged copies thereof may be optionally formed. In this mode, projector 20 serves as an additional illumination source. Transparency 18 is placed beneath Fresnel lens 32 with composition frame 36 positioned on platen 38. The aperture of frame 36 is designed to extend in an outwardly direction from the borders of transparency 18. If desired, a plurality of transparencies may be positioned beneath lens 32 with composition frame 36 having a corresponding number of apertures therein, each aperture being adapted to be positioned over one transparency. Hence, the copy being reproduced by the printing machine will comprise one or a plurality of size for size transparencies.

As shown in FIG. 1, the light image of the color transparency is reflected in a downwardly direction by mirror 30 to pass through screen 34 so as to be modulated thereby. The combined light image of the transparency and composition frame is reflected by mirror 48 through lens 42 and filter 44 forming a single color light image. The single color light image is reflected by mirror 50 in a downwardly direction onto the charged portion of photoconductive surface 12. Thus, the modulated single color light image irradiates the charged portion of photoconductive surface 12 recording a single color electrostatic latent image thereon. Similarly, the light image of composition frame 40 irradiates the charged portion of photoconductive surface 12 forming an unmodulated light image thereon in registration with the single color electrostatic latent image formed from the modulated light image of the color transparency.

Filter mechanism 44 interposes selected color filters into the optical path of lens 42 during the exposure process. The appropriate filter operates on the light rays transmitted through lens 42 to form a light image corresponding to a single color of the transparency.

As heretofore indicated, lamps 46 are arranged to traverse platen 38 illuminating incremental widths of composition frame 36. Lamps 46 are mounted on a suitable carriage (not shown) which is driven by a cable pulley system (not shown) from the drive motor (not shown) rotating drum 10. As the lamp carriage traverses platen 38, another cable pulley system (not shown) moves lens 42 and filter 44 at a correlated speed therewith. Filter mechanism 44 is mounted on a suitable bracket extending from lens 42 to move in conjunction therewith. Lamps 46, lens 42, filter 44 scan the combined light image to produce a flowing light image thereof. Slide projector 20 projects an enlarged light image of the color transparency 18. Preferably, projector 20 is a Kodak Carousel 600 projector having an F/3.5 Ektanar C projection lens with light source 22 being a quartz lamp.

Preferably, Fresnel lens 32 comprises small, recurring light, deflecting elements that will, as an entire unit, achieve a uniform distribution of light over a predetermined area. The grating or grooves therein are preferably about 200 or more per inch. Fresnel lens 32 converges the diverging light rays from lens 24. Thus, the light rays transmitted through platen 38 are substantially parallel to one another. Other suitable field lenses may be employed in lieu of a Fresnel lens. The light image of the color transparency passes through a screen which modulates it forming a half-tone light image. Hence, a modulated light image is combined with the image of composition frame 40 and incremental areas thereof are projected onto photo-conductive surface 12 discharging the charge thereon. For further details regarding the drive mechanism of the optical system, reference is had to U.S. Pat. No. 3,062,108 issued to Mayo et al. in 1962.

Preferably, lens 42 is a six-element split dagor type of lens having front and back compound lens components with a centrally located diaphragm therebetween. Lens 42 forms a high quality image with a field angle of about 31° and a speed ranging from about F/4.5 to about F/8.5 at a 1:1 magnification. Moreover, lens 42 is designed to minimize the effect of secondary color in the image plane. The front lens component has three lens elements including, in the following order, a first lens element of positive power, a second lens element of negative power cemented to the first lens element, and a third lens element of positive power disposed between the second lens element and the diaphragm. The back lens component also has three similar lens elements positioned so that lens 42 is symmetrical. Specifically, the first lens element in the front component is a double convex lens, the second element a double concave lens, and the third element a convex-concave lens element. For greater details regarding lens 42, reference is made to U.S. Pat. No. 3,592,531 issued to McCrobie in 1971.

With continued reference to FIG. 1, filter 44 includes a housing which is mounted on lens 42 by a suitable bracket and moves with lens 42 during scanning as a single unit. The housing of filter 44 includes a window which is positioned relative to lens 42 permitting the light rays of the combined image, i.e., that of the composition frame and transparency to pass therethrough. Bottom and top walls of the housing include a plurality of tracks extending the entire width thereof. Each of these tracks is adapted to carry a filter permitting the movement thereof from an inoperative position to an operative position. In the operative position, the filter is located in the window of the housing permitting light rays to pass therethrough. Preferably, three filters are employed in the electrophotographic printing machine, a red filter, a blue filter, and a green filter. A detailed description of the filter mechanism is found in U.S. Pat. No. 3,775,006 issued to Hartman et al., in 1973.

Screen 34 includes preferably a substantially transparent sheet made from a suitable plastic or glass. A plurality of spaced, opaque dots or lines are printed on the transparent sheet by a suitable chemical etching or photographic technique. The screen may be made from any number of opaque metallic materials suitable for chemical etching which are sufficiently thin to be flexible, such as copper or aluminum. The spacing between adjacent lines or dots determines the quality of the resulting copy. A fine screen size generally results in a more natural or higher quality copy. Thus, while coarse screens having 50 to 60 lines or dots per inch will be useful for some purposes, finer screens such as those having anywhere from 100 to 400 dots or lines per inch will form a copy of nearly continuous tone appearance. With finer screens, the screen pattern may be hardly perceptable on the finished copy and the copy will have the appearance of a continuous tone photograph. A suitable line screen may have about 120 lines per inch. Contrawise, a suitable dot screen may comprise a plurality of equally spaced soft gray square dots having about 85 dots per inch. However, this may range from about 65 to about 300 dots per inch. The dot or line frequency is limited only by the optical system and the desired resolution. A suitable dot screen is manufactured by the Caprock Corporation and may be a negative screen. An optical system employing such a screen for reproducing transparencies is described in co-pending application Ser. No. 540,617 filed in 1975.

With continued reference to FIG. 1, after the electrostatic latent image is recorded on photoconductive surface 12, drum 10 rotates to development station C. At development station C, three individual developer units, generally indicated by the reference numerals 52, 54 and 56, respectively, are arranged to render visible the electrostatic latent image recorded on photoconductive surface 12. Preferably, each of the developer units is of a type generally referred to in the art as "magnetic brush developer units." A typical magnetic brush developer unit employs a magnetizable developer mix which includes carrier granules and heat settable toner particles. In operation, the developer mix is continually brought through a directional flux field forming a chain-like array of fibers extending outwardly from a developer roll. This chain-like array of fibers is frequently termed a brush. The electrostatic latent image recorded on photoconductive surface 12 is rotated into contact with the brush of developer mix. Toner particles are attracted from the carrier granules to the latent image. Each of the developer units contain appropriately colored toner particles. For example, a green filtered light image is developed by depositing magenta toner particles thereon. Similarly, a red filtered light image is developed with cyan toner particles and a blue filtered light image with yellow toner particles. A development system of this type is described in U.S. Pat. No. 3,854,449 issued to Davidson in 1974.

After the single color electrostatic latent image is developed, drum 10 rotates to transfer station D. At transfer station D, the toner powder image adhering electrostatically to photoconductive surface 12 is transferred to a sheet of support material 58. Support material 58 may be plain paper or a sheet of plastic material, amongst others. Transfer station D includes corona generating means, indicated generally at 60, and a transfer roll designated generally by the reference numeral 62. Corona generator 60 is excited with an alternating current and arranged to pre-condition the toner powder image adhering electrostatically to photoconductive surface 12. In this manner, the pre-conditioned toner powder image will be more readily transferred from the electrostatic latent image recorded on photoconductive surface 12 to support material 58 secured releasably on transfer roll 62. Transfer roll 62 recirculates support material 58 and is electrically biased to a potential of sufficient magnitude and polarity to attract electrostatically the pre-conditioned toner particles from the latent image recorded on photoconductive surface 12 to support material 58. Drum 10 and transfer roll 62 rotate in synchronism with one another, thereby maintaining support material 58 in registration with the electrostatic latent image recorded on photoconductive surface 12. Transfer roll 62 rotates in the direction of arrow 64. This enables successive toner powder images to be transferred to support material 58, in superimposed registration with one another. U.S. Pat. No. 3,838,918 issued to Fisher in 1974 discloses such a transfer system.

Turning now to a brief description of the sheet feeding path, support material 58 is advanced from stack 66 mounted on tray 68. Feed roll 70, in operative communication with retard roll 72, advances and separates the uppermost sheet from stack 66. The advancing sheet moves into chute 74 which directs it into the nip between register rolls 76. Register rolls 76 align and forward the sheet to gripper fingers 78 which secure support material 58 releasably on transfer roll 62. After the requisite number of toner powder images have been transferred to support material 58, gripper finger 78 release support material 58 and space it from transfer roll 62. As transfer roll 62 continues to rotate in the direction of arrow 64, stripper bar 80 is interposed therebetween. In this manner, support material 58 passes over stripper bar 80 onto endless belt conveyor 82. Endless belt conveyor 82 advances support material 58 to fixing station E.

At fixing station E, a fuser, indicated generally by the reference numeral 84, generates sufficient heat to permanently affix the multi-layered powder image to support material 58. A suitable fusing device is described in U.S. Pat. No. 3,781,156 issued to Tsilibes et al. in 1973.

After the fixing process, support material 58 is advanced by endless belt conveyors 86 and 88 to catch tray 90 permitting the machine operator to remove the finished color copy from the printing machine.

Although a preponderance of the toner particles are transferred to support material 58, invariable some residual toner particles adhere to photoconductive surface 12 after the transfer process. These residual toner particles are removed from photoconductive surface 12 at cleaning station F. Cleaning station F includes a cleaning corona generating device (not shown) for neutralizing the electrostatic charge remaining on the residual toner particles and photoconductive surface 12. The neutralized toner particles are then cleaned from photoconductive surface 12 by a rotatably mounted fibrous brush 92 in contact therewith. A suitable brush cleaning device is described in U.S. Pat. No. 3,590,412 issued to Gerbasi in 1971.

It is believed that the foregoing description is sufficient for purposes of the present application to depict the general operation of the electrophotographic printing machine incorporating the features of the present invention therein.

Figure 2:
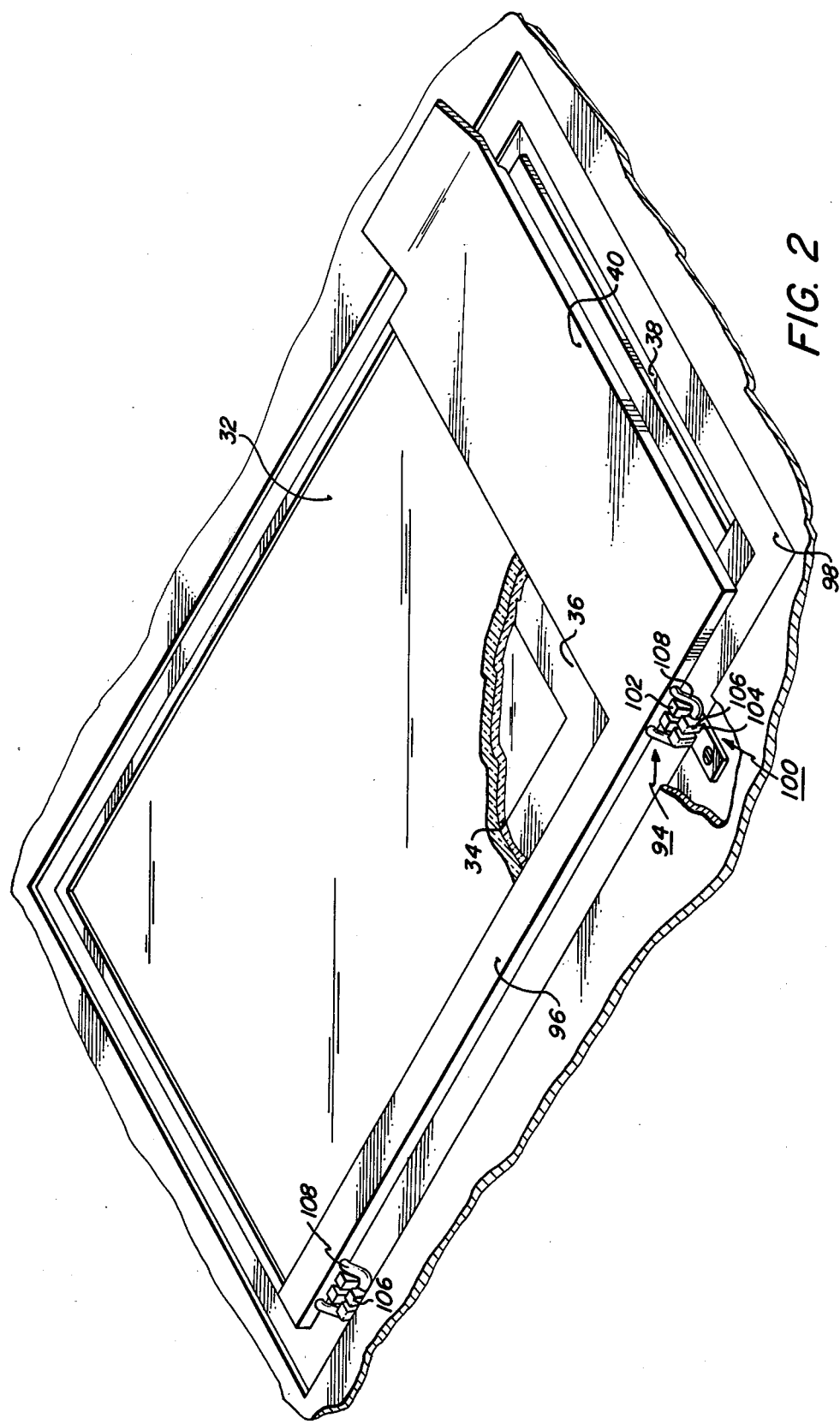
FIG. 2 is an enlarged perspective view depicting the frame holding the field lens and screen movably on the FIG. 1 printing machine platen.

Referring now to FIG. 2, the specific features of the present invention are described therein. More particularly, the relationship of platen 38 to Fresnel lens 32, screen 34 and composition frame 36 is discussed hereinafter. Composition frame 36 is disposed upon platen 38. Frame 40 holds Fresnel lens 32 and screen 34 contiguous with one another and in contact with composition frame 36 disposed on platen 38. In this manner, the transparency light image passes through lens 32, screen 34, frame 36 and transparent platen 38. Platen 38 is mounted in an aperture in the printing machine frame. Frame 40 includes a pair of opposed spaced U-shaped brackets 94 secured along marginal region 96 thereof. As previously noted, platen 38 is mounted in an aperture of the printing machine. The aperture has a frame 98 positioned therein for supporting platen 38. Frame 98 includes a pair of opposed spaced supports 100. Support 100 includes a bottom portion 102 secured to frame 98. Upper portion 104 of support 100 is bent back over bottom portion defining a U-shaped opening. At the entrance to the U-shaped opening, top portion 104 has an arcuate portion 106. Arcuate portion 106 is arranged in such a manner that it defines an entrance opening in which U-shaped brackets 94 may be inserted. The space between bottom portion 102 and top portion 104 is arranged to be slightly less than the diameter of bar 108 of bracket 94. In this way, bar 108 is snapped into position between bottom portion 102 and top portion 94 of support 100 and located in arcuate portion 106 thereof. Preferably, bottom portion 102, and top portion 104 of support 100 are made from a spring metal so as to resiliently secure bar 108 of bracket 94 in arcuate portion 106 thereof. In this arrangement, bar 108 is mounted removably and rotatably in portion 106 of support 100. This enables frame 40 to be rotated relative to platen 38 and to be readily removed therefrom. During the transparency reproducing mode, frame 40 having lens 32 and screen 34 mounted therein is secured removably and rotatably on platen 38 by snapping bracket 94 in support 100. Contrawise, in the opaque original document reproduction mode, frame 40 is removed from platen 38 by snapping bracket 94 out of support 100.

In recapitulation, it is evident that the electrophotographic printing machines depicted in FIG. 2 is arranged to reproduce either an opaque original document or a color transparency. When an opaque original document is being reproduced, the field lens and screen are moved out of the transparency light image path. Contrawise, if a transparency is being reproduced, the field lens and screen are positioned in the transparency light image path. Thus, pictorial quality copies may be achieved by the utilization of the foregoing apparatus. This apparatus maintains the screen and field lens in registration with the machine platen as well as reducing the possibility of loss thereof.

Hence, it is apparent that there has been provided in accordance with the present invention, an electrophotographic printing machine that fully satisfies the objects, aims and advantages hereinbefore set forth. While this invention has been disclosed in conjunction with a specific embodiment thereof, it is evidient that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. An electrophotographic printing machine for reproducing a transparency or opaque original document, including:
   a transparent platen;
   a photoconductive member;
   means for charging said photoconductive member to a substantially uniform level;

means for forming a light image of the transparency; and means, mounted movably on said transparent platen, for modulating the light image, said modulating means being movable from a first position remote from the transparency light image path for reproducing the opaque original document to a second position in the transparency light image path for reproducing the transparency, said forming means projecting the transparency light image through said modulating means onto the charged portion of said photoconductive member to selectively dissipate the charge recording thereon a modulated electrostatic latent image of the transparency.

2. A printing machine as recited in claim 1, further including:

a composition frame positioned on said transparent platen; and means for exposing the charged portion of said photo-conductive member to a light image of said composition frame to record thereon a combined electrostatic latent image of the transparency electrostatic latent image and the composition frame electrostatic latent image.

3. A printing machine as recited in claim 2, wherein said modulating means includes:

a frame mounted pivotably and removably on said transparent platen; and a screen mounted in said frame and arranged to move therewith.

4. A printing machine as recited in claim 3, further including a field lens mounted in said frame contiguous with said screen, said composition frame being interposed between said screen and said transparent platen.

5. A printing machine as recited in claim 4, wherein said exposing means includes:

a light source arranged to illuminate said composition frame; and a lens for receiving the light rays from the transparency and said composition frame to form a combined image thereof.

6. A printing machine as recited in claim 5, wherein said forming means includes a slide projector located on the printing machine for projecting a light image of the transparency through said field lens and said screen disposed on said transparent platen.

7. A printing machine as recited in Claim 6, further including:

means for filtering the combined light image to form a single color light image which irradiates the charged portion of said photoconductive member to record thereon a single color electrostatic latent image;

means for developing the single color electrostatic latent image recorded on said photoconductive member with toner particles complementary in color to the color of the single color light image;

means for transferring the toner powder image from the electrostatic latent image recorded on said photoconductive member to a sheet of support material; and means for fusing the toner powder image to the sheet of support material.

8. A printing machine as recited in claim 7, wherein said screen includes a plurality of spaced dots.

9. A printing machine as recited in claim 8, wherein said screen includes a plurality of soft gray square dots.

10. A printing machine as recited in claim 9, wherein said screen preferably includes 85 dots per inch.

11. A printing machine as recited in claim 10, wherein said field lens preferably includes 200 gratings per inch.

* * * * *